United States Patent [19]

Gehlen

[11] 4,420,118

[45] Dec. 13, 1983

[54] CAULIFLOWER SIZE CUTTER

[75] Inventor: Gary N. Gehlen, Stayton, Oreg.

[73] Assignee: Stayton Canning Company Cooperative, Stayton, Oreg.

[21] Appl. No.: 285,371

[22] Filed: Jul. 14, 1981

[51] Int. Cl.³ .............................................. B02C 19/00
[52] U.S. Cl. ................................ 241/101.2; 241/236; 83/407; 83/423; 83/109; 99/643; 198/624
[58] Field of Search ................... 83/407, 409, 422, 423, 83/425.2, 425.3, 425.4, 431, 303, 44, 45; 241/236, 152 A, 154, 29, 187, 101.2; 99/643; 198/624, 834

[56] References Cited

U.S. PATENT DOCUMENTS

| | | | |
|---|---|---|---|
| 1,036,327 | 8/1912 | Pickett | 241/187 X |
| 2,011,871 | 8/1935 | Poulin | 83/432 |
| 2,044,835 | 6/1936 | Criner | 83/423 X |
| 2,716,318 | 8/1955 | Skromme | 83/422 X |
| 3,396,914 | 8/1968 | Liebman | 241/187 X |
| 3,654,978 | 4/1972 | Gabel | 83/423 X |

Primary Examiner—William R. Briggs
Assistant Examiner—L. Meier
Attorney, Agent, or Firm—Harvey B. Jacobson

[57] ABSTRACT

A cutting device for cutting deleaved and cored heads of cauliflower into predetermined smaller sizes comprises a cleated conveyor for conveying the cored cauliflower heads, a first series of circular knives equally spaced and transversely positioned along the conveyed path of the cauliflower, a first stripper bar associated with the first series of knives to remove cauliflower from between the knife edges, a rotating paddle extending transverely across the conveyor and immediately downstream from the stripper bar so as to settle cauliflower pieces back onto the conveyor between the cleats and ready the cauliflower chunks for further cutting, a second series of circular knives spaced transversely across the conveyor and a stripper bar associated with the second series of knives so as to clear the cauliflower that sticks between the circular knives. Optionally, a cluster buster can be positioned upstream from the first series of knives to break any excessively large heads of cauliflower into smaller pieces before being cut to the predetermined size.

2 Claims, 5 Drawing Figures

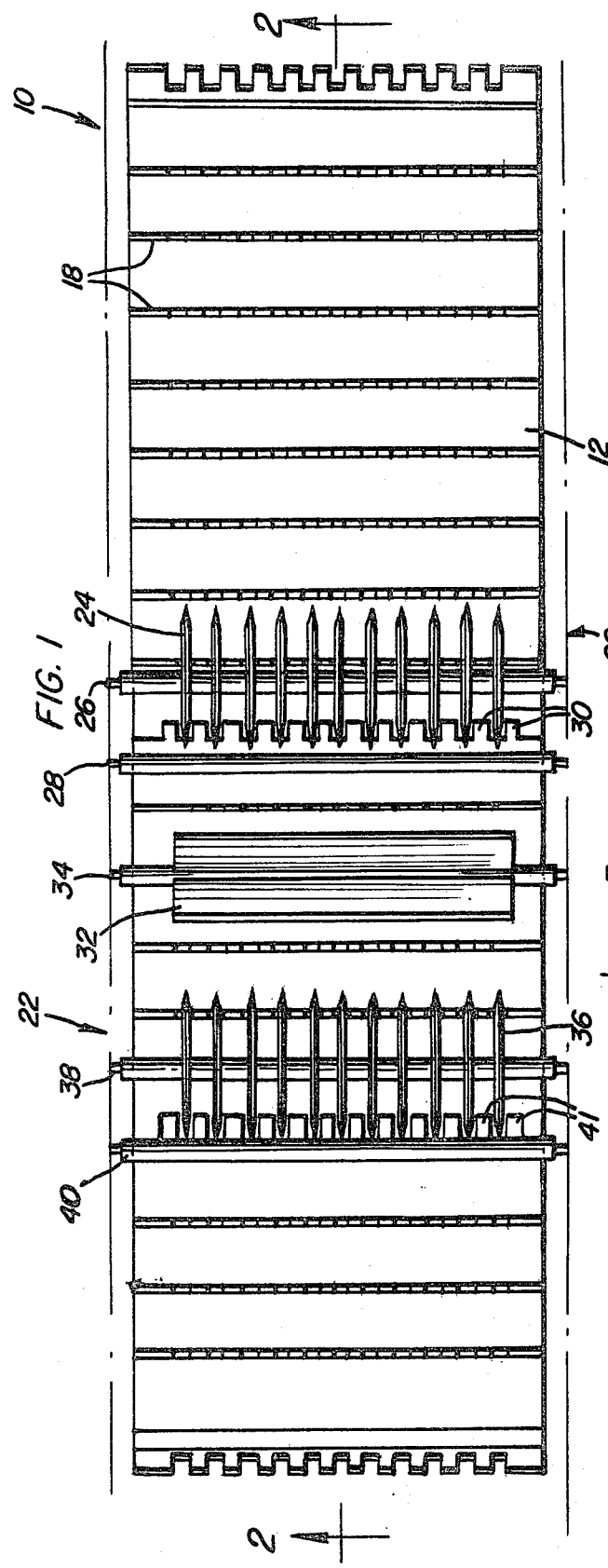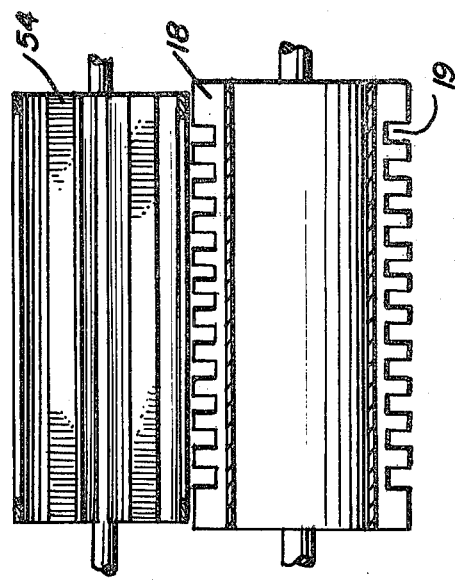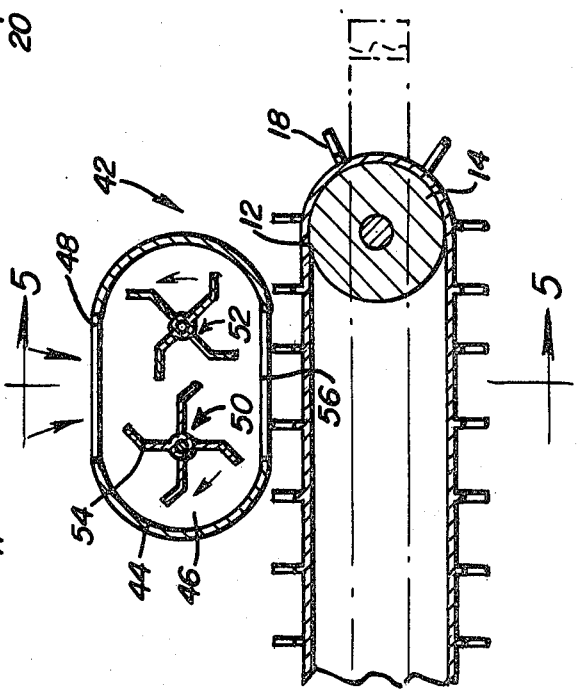

CAULIFLOWER SIZE CUTTER

BACKGROUND OF THE INVENTION

Field of the Invention

This invention relates to vegetable cutters in general and, more particularly, to a cutting device for cutting deleaved and cored cauliflower heads into pieces of uniform size.

In processing cauliflower in particular, the head of the cauliflower is deleaved and then placed into a coring machine which cuts the stem off and removes the core from the cauliflower head. In the process of coring the cauliflower, a large percentage of the cauliflower is formed into large cauliflower pieces approximating the size of one's fist. Heretofore, these large pieces of cauliflower which are produced during the coring operation are cut smaller by hand or in cluster busters which are paddle-like beaters which tumble and break up the large pieces into smaller pieces suitable for packaging and sale to consumers. Besides requiring a substantial time for hand cutting the cauliflower pieces, not to mention the labor costs involved, hand cutting the cauliflower into smaller chunks of florets is a considerable safety hazard that results in occasional operator injury even when due care is exercised. Cluster busters or beater bars, while successfully breaking the cauliflower into smaller chunks, also create torn ends which drastically reduces the commercial quality of the cut cauliflower pieces.

An example of a patented cauliflower coring and floreting apparatus can be found in U.S. Pat. No. 3,754,470, issued to Console on Aug. 28, 1973. In this particular apparatus, cauliflower heads that have had their stems cut off are manually placed, top down, onto holding cups attached to a horizontally moving conveyor belt that moves cauliflower at a continuous rate toward a cauliflower coring and floreting station. The coring and floreting station comprises an overhead assembly and includes a rotating turntable carrying a pair of cutting and floreting head assemblies having rotating coring knives and beaters to break up the cauliflower into florets. The present invention is not concerned with cutting apparatus for coring cauliflower since use of the present invention will be after the cauliflower has been cored. Accordingly, the Console patent is similar to the devices used for coring the cauliflower presently in use, but is not similar to the present invention which utilizes a series of rotating knives positioned transversely across a moving conveyor to cut the cauliflower chunks into small pieces without the extensive use of beaters which, as previously mentioned, often damage the cauliflower to less than acceptable quality.

SUMMARY OF THE INVENTION

In accordance with the present invention, cauliflower heads that have been deleaved and placed into a coring machine which cuts the stem off and removes the core from the cauliflower head are placed onto a cleated conveyor which comprises a flat conveyor surface which is sectioned by means of vertical cleats traversing the entire width of the conveyor. The horizontally moving conveyor moves the large pieces of cauliflower past a first cutting station comprising a series of rotating circular knives which are uniformly spaced across the width of the conveyor and which are associated with a stripper bar which removes any cauliflower pieces which are stuck between the knives. A downstream rotating paddle settles cauliflower ejected from the knives back onto the conveyor securely between the cleats readying the cut cauliflower chunks for a second cutting station which comprises a plurality of revolving circular knives positioned across the width of the conveyor similar to the first cutting station. In the second cutting station, the cauliflower chunks are cut to final size and again stripped from between the knives by means of an associated stripper bar. The finally sized cut cauliflower is then discharged from the conveyor. Optionally, a cluster buster which comprises a pair of gear driven, intermeshing paddles may be positioned upstream of the first cutting station and used to break up extremely large pieces of cauliflower before being passed to the first cutting station and thus maintain production efficiency and size uniformity. The particular drive mechanism for the conveyor as well as the revolving circular knives and rotating paddles for use in the cluster buster and between the first and second cutting stations forms no part of the invention and can include any conventional gear-drive, belt-drive, or other like mechanism.

Accordingly, it is an object of the present invention to cut heads of cauliflower into uniform size suitable for packaging and sale to consumers.

Another object of the present invention is to cut heads of cauliflower into uniformly sized pieces in a safe and less costly manner.

Still another object of the present invention is to provide a cauliflower cutting device which takes up relatively little floor space, can be operated automatically without the need for manual labor and can be maintained clean and sanitary for the purpose of cutting cauliflower into uniform small chunks suitable for packaging and sale to consumers.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the cauliflower size cutter of the present invention.

FIG. 4 is a fragmentary longitudinal sectional view of the cauliflower size cutter of the present invention containing the optional cluster buster upstream of the first cutting station.

FIG. 5 is a transverse sectional view through the cluster buster taken generally along the line 5—5 of FIG. 4.

DETAILED DESCRIPTION OF THE INVENTION

Figure 2:
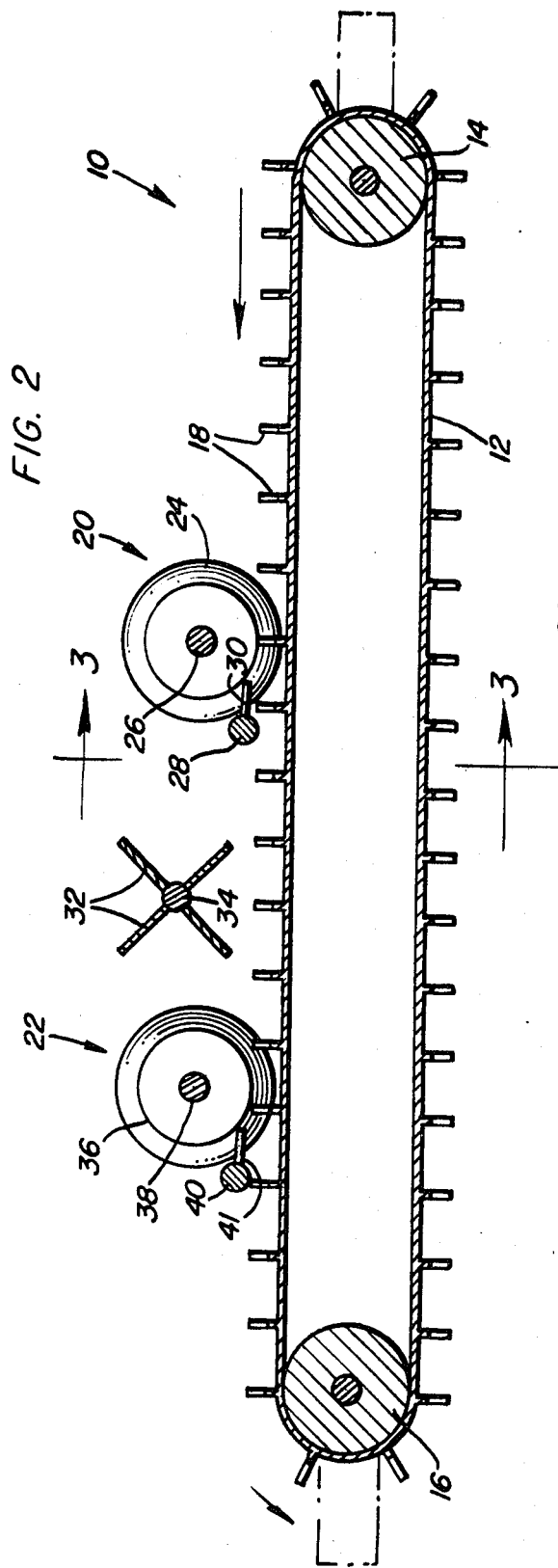
FIG. 2 is a longitudinal sectional view through the cauliflower size cutter taken generally along the line 2—2 of FIG. 1.
Figure 3:
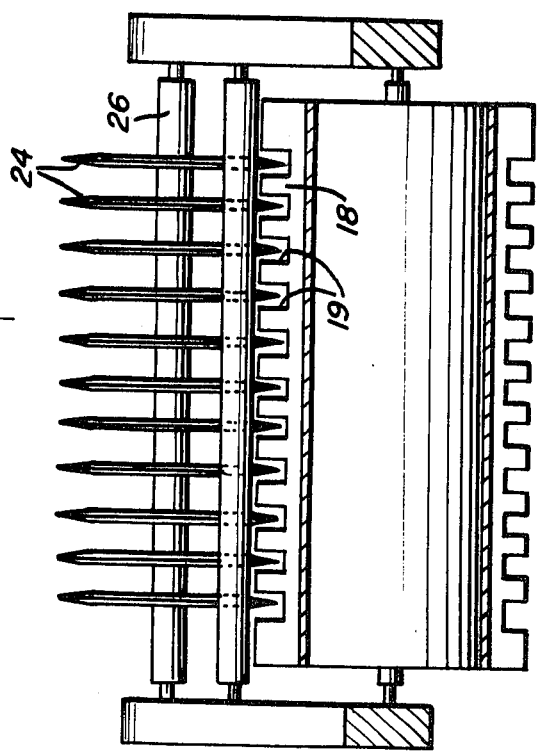
FIG. 3 is a transverse section of the cauliflower size cutter taken generally along the line 3—3 of FIG. 2.

Referring to FIGS. 1 and 2, the cauliflower size cutter of the present invention is generally indicated by reference numeral 10. The cauliflower cutter 10 comprises an endless conveyor belt 12 supported for movement around journaled rollers 14 and 16. Rollers 14 and 16 are driven by any conventional driving means, the particular drive means utilized not being a critical part of what is characterized as the cauliflower size cutter of the present invention. Spaced along the entire length of endless conveyor belt 12 and extending across substantially the entire width of the conveyor belt are vertical cleats 18 which aid in pushing the cauliflower pieces through first and second cutting stations 20 and 22, respectively. Each vertical cleat 18 contains a plurality of recesses 19 which allow the individual cleats 18 to pass through the respective cutting stations 20 and 22. As can be seen in FIG. 3, recesses 19 are aligned with each of the revolving circular knives positioned in each of the cutting stations. Cutting station 20 comprises a plurality of circular knives 24 which are positioned for rotation on arbor 26. As can be seen in FIG. 1, circular revolving knives 24 are uniformly spaced across the width of conveyor belt 12 and cover substantially the entire width of conveyor belt 12 so as to insure that the majority of cauliflower pieces which are fed onto the conveyor are cut to a first predetermined size. Immediately downstream of revolving knives 24 is stripper bar 28 which comprises a plurality of fingers 30 which laterally project from bar 28 into the spaces formed between the individually spaced circular knives 24. Fingers 30 remove any pieces of cauliflower which become lodged between the knives 24 or adhered to the knife surface and direct the dislodged cauliflower pieces onto conveyor belt 12 which moves the cut pieces to second cutting station 22. As can be seen in FIG. 1, all the spaces adjacent to circular knives 24 have included therein fingers 30, so that both sides of each circular knife 24 is cleaned of any lodged or adhered cauliflower pieces.

When passing through cutting station 20, often times revolving circular knives 24 will throw the cauliflower pieces being cut into the air and if such pieces are not settled back down onto conveyor belt 12 before passing through second cutting station 22, it is difficult to provide cauliflower pieces of a uniform size leaving cutting station 22. Accordingly, a plurality of rotating paddles 32 radially extending from a single rotating axle 34 are provided downstream from cutting station 20 and intermediate between cutting stations 20 and 22. The radially extending paddle members 32 extend laterally across substantially the entire width of conveyor belt 12 and knock down any air borne pieces of cauliflower which are thrown from cutting station 20. Rotating paddles 32 settle the cauliflower pieces back onto conveyor 12 securely between cleats 18 and thus ready the cut cauliflower pieces for the second cutting in cutting station 22. Similarly, any location excessive piles of cauliflower pieces leaving cutting station 20 are leveled by contact with paddles 32.

Cutting station 22 is equivalent to cutting station 20 and comprises a plurality of circular knives 36 spaced transversely across the width of conveyor belt 12 and supported for rotation by arbor 38. Stripper bar 40 containing fingers 41 insure that all of the cut cauliflower pieces which are lodged between the individual knives 36 or are adhered thereto are removed and deflected onto conveyor belt 12 for discharge from cauliflower size cutter 10. The cauliflower pieces leaving second cutting station 22 are now at the predetermined smaller size suitable for packaging and for sale to consumers.

Rotation of conveyor rollers 14 and 16, arbors 26 and 38 and axle 34 can be accomplished by any conventional common drive means, individual drive means, or combinations thereof. The exact structure by which the rotating axles are journaled for rotation, as mentioned above, is not a critical feature of the present invention.

Often times, the heads of cauliflower leaving the coring machine are of excessively large size. Such large cauliflower pieces could reduce production efficiency and quality if passed through cutting stations 20 and 22. Such excessively large pieces of cauliflower will often not be cut to the same size as the other pieces thus reducing product acceptability with the consuming public. Excessively large pieces of cauliflower can also become lodged between the knives, possibly to the extent of not being efficiently removed by the stripper bars and can even slow and even damage the revolving knives. Accordingly, it may be desirable to include what is commonly known as a cluster buster on the entrance point of cauliflower size cutter 10. Referring to FIGS. 4 and 5, a cluster buster 42 is provided slightly above cleats 18 of conveyor belt 12. Cluster buster 42 comprises a casing 44 enclosing a space 46 in which the excessively large pieces of cored cauliflower are treated in order to break the large pieces into pieces which can be efficiently sized by cutter 10. Casing 44 includes an open area 48 at the top so as to allow the charging of space 46 with the large cauliflower heads. Within casing 44 are placed a pair of rotating intermeshing paddles 50 and 52, each of which includes a plurality of paddle blades 54 which contact and tumble the excessively large cauliflower heads to break up the heads into smaller pieces. Casing 44 as well as the individual paddle blades 54 of each paddle 50 and 52 extend laterally across the substantial width of conveyor belt 12. The pre-cut cauliflower pieces are discharged by gravity through outlet 56 extending laterally along the bottom of casing 44. The discharged cauliflower pieces fall onto conveyor belt 12 securely between cleats 18. Paddles 50 and 52 are preferably gear driven, although as in the other rotating structures of size cutter 10, any driving means including gear driven, belt driven, etc., can be utilized.

Cauliflower size cutter 10 can operate substantially without manual labor, thus eliminating a great many of the labor costs as well as health and safety costs which became quite excessive when the pieces were cut by hand. In accordance with the present invention, the cored cauliflower can be transferred automatically from the coring machine onto conveyor belt 12 or from the coring machine into cluster buster 42. The cauliflower pieces are automatically conveyed by conveyor belt 12 through the individual processing stations of size cutter 10 and require no manual labor to feed, adjust or discharge the cut cauliflower pieces from conveyor belt 12. Accordingly, it can be seen that size cutter 10 can produce a commercially suitable product without expensive labor costs. Furthermore, the processing stations of cauliflower size cutter 10 are simple to manufacture, do not require an excessive amount of components and can be maintained in effective working order by simple lubrication. Furthermore, the use of an endless conveyor 12 which travels above and below a set of rollers allows conveyor belt 12 to be cleaned as the conveyor passes underneath rollers 14 and 16 and thus sanitary conditions can be maintained. Similarly, less floor space is required which also reduces processing costs.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A machine for cutting large vegetables such as cauliflower into smaller pieces comprising a conveyor belt having a plurality of transversely extending cleats projecting perpendicularly therefrom to form a plurality of transversely extending pockets, means supporting said conveyor belt with an elongated portion disposed horizontally whereby vegetables may be gravity fed into the pockets, a first cutting station overlying the belt, a second cutting station overlying the belt in longitudinally spaced relation to said first cutting station, each of said cutting stations including a plurality of spaced circular knives having a sharp peripheral edge disposed adjacent the upper surface of the belt, a shaft journaling said knives, a stripper bar paralleling the shaft on the downstream side of each cutting station, and a plurality of fingers on the stripper bar inserted between the knives to strip material therefrom, each of said cleats including slot-like notches therein through which the periphery of the knives can pass thereby permitting the knives to cut the vegetables in the pockets without cutting the cleats, a transversely extending shaft mounted for rotation and disposed above and parallel to the conveyor belt between the cutting stations, a plurality of radial paddles on said transversely extending shaft to engage any vegetable pieces above the cleats and move them into the pockets for cutting by the knives in the second cutting station, said stripper bars and fingers being located adjacent the upper edge of the cleats with the fingers generally horizontally disposed.

2. The machine as defined in claim 1 together with a vegetable feeding and breaking device positioned transversely above the conveyor belt in spaced relation to the first cutting station and in remote relation to the second cutting station, said feeding and breaking device comprising a hollow housing positioned transversely above the conveyor and provided with an upwardly facing inlet and downwardly facing outlet adjacent the upper edge of the cleats, a pair of transversely extending driven paddles disposed within said housing with the paddles being spaced in intermeshing relation to break large vegetables into smaller pieces and discharge the smaller pieces onto the conveyor belt by gravity with the lower surface of the housing moving the smaller pieces into the pockets for cutting by the knives in the first cutting station.

* * * * *